US009987822B2

(12) United States Patent
Ku

(10) Patent No.: US 9,987,822 B2
(45) Date of Patent: Jun. 5, 2018

(54) METHOD OF ADHERING MULTIPLE POLYURETHANE FOAM LAYERS TOGETHER

(71) Applicant: Tun-Jen Ku, Taichung (TW)

(72) Inventor: Tun-Jen Ku, Taichung (TW)

( * ) Notice: Subject to any disclaimer, the term of this patent is extended or adjusted under 35 U.S.C. 154(b) by 0 days. days.

(21) Appl. No.: 15/272,517

(22) Filed: Sep. 22, 2016

(65) Prior Publication Data

US 2018/0079167 A1   Mar. 22, 2018

(51) Int. Cl.
*B41M 5/52* (2006.01)
*B29C 70/84* (2006.01)
*B32B 5/18* (2006.01)
*B32B 37/00* (2006.01)

(52) U.S. Cl.
CPC ............ *B32B 5/18* (2013.01); *B32B 37/0053* (2013.01); *B32B 2266/0278* (2013.01); *B32B 2479/00* (2013.01)

(58) Field of Classification Search
CPC ................. B32B 5/18; B32B 37/0053; B32B 2266/0278
USPC ........................................ 156/235, 242, 264
See application file for complete search history.

(56) References Cited

U.S. PATENT DOCUMENTS

| 4,350,734 A * | 9/1982 | Hammond | ............... B32B 5/18 428/308.4 |
| 2011/0067183 A1* | 3/2011 | Hawkins | .............. A47C 27/144 5/740 |

FOREIGN PATENT DOCUMENTS

WO   WO 2010056250 A1 *   5/2010   ............... B32B 5/18

\* cited by examiner

*Primary Examiner* — Sonya Mazumdar
(74) *Attorney, Agent, or Firm* — Alan D. Kamrath; Kamrath IP Lawfirm, P.A.

(57) ABSTRACT

A method of adhering multiple polyurethane foam layers together sticks a first polyurethane foam layer with a second polyurethane foam layer by using polyurethane system components in polymerization foaming reaction. The method contains steps of: A. delivering the first polyurethane foam layer toward a cladding position; B. cladding or depositing the polyurethane system components on the first polyurethane foam layer at the cladding position so that the polyurethane system components start foaming polymerization on and adhere with the first polyurethane foam layer; C. delivering the polyurethane system components and the first polyurethane foam layer to a press roller so that the polyurethane system components foam to produce the second polyurethane foam layer, and the second polyurethane foam layer adheres with the first polyurethane foam layer; and D. conveying the second polyurethane foam layer and the first polyurethane foam layer away from the press roller.

9 Claims, 4 Drawing Sheets

METHOD OF ADHERING MULTIPLE POLYURETHANE FOAM LAYERS TOGETHER

FIELD OF THE INVENTION

The present invention relates to a method of adhering multiple polyurethane foam layers together to stick the multiple polyurethane foam layers successively to enhance adhesion and production capacity.

BACKGROUND OF THE INVENTION

A polyurethane foam (PU foam) layer is made of polyurethane system components comprised of an isocyanate component and a polyol component. Water and a catalyst are added into the polyurethane system components so that the water and the isocyanate component are mixed to produce carbon dioxide by which the polyurethane foam layer is foamed. The PU foam layer is applicable for building materials, packaging material, and vibration absorption material, such as mattresses, cushions or insoles.

As shown in FIG. 1, a method of adhering three polyurethane foam layers together to produce mattresses contains steps of: providing a hard polyurethane foam layer 1, an intermediate polyurethane foam layer 2, and a soft polyurethane foam layer 3 (such as a memory foam), and adhering the hard polyurethane foam layer 1, the intermediate polyurethane foam layer 2, and the soft polyurethane foam layer 3 together by using adhesive 4. However, such a method has defects as follows:

1. The adhesive 4 causes environment damage.
2. The multiple polyurethane foam layers cannot be adhered securely by using the adhesive 4.
3. Due to the multiple polyurethane foam layers having different properties, they foam respectively and then are adhered together, thus reducing production efficiency.
4. After foaming the multiple polyurethane foam layers, the adhesive 4 is clad on the multiple polyurethane foam layers, thereby having troublesome production.
5. After foaming the multiple polyurethane foam layers, the adhesive 4 is clad on the multiple polyurethane foam layers so that the multiple polyurethane foam layers adhere together, but such an adhering method will limit production sizes of the multiple polyurethane foam layers.

The present invention has arisen to mitigate and/or obviate the afore-described disadvantages.

SUMMARY OF THE INVENTION

The primary objective of the present invention is to provide a method of adhering multiple polyurethane foam layers together to stick the multiple polyurethane foam layers successively by way of polyurethane system components in a polymerization foaming reaction to protect the environment.

A secondary objective of the present invention is to provide a method of adhering multiple polyurethane foam layers together to stick the multiple polyurethane foam layers successively by way of polyurethane system components in a polymerization foaming reaction to enhance adhesion capacity.

A third objective of the present invention is to provide a method of adhering multiple polyurethane foam layers together to stick the multiple polyurethane foam layers successively by way of polyurethane system components in a polymerization foaming reaction to accelerate production.

A fourth objective of the present invention is to provide a method of adhering multiple polyurethane foam layers together to stick the multiple polyurethane foam layers successively by way of polyurethane system components in a polymerization foaming reaction, with the polyurethane system components having different properties and starting foaming polymerization on and adhering with the multiple polyurethane foam layers, thus enhancing production capacity.

Another objective of the present invention is to provide a method of adhering multiple polyurethane foam layers together to stick the multiple polyurethane foam layers successively by way of polyurethane system components in a polymerization foaming reaction to increase sizes of the multiple polyurethane foam layers.

DETAILED DESCRIPTION OF THE PREFERRED EMBODIMENTS

Figure 1:
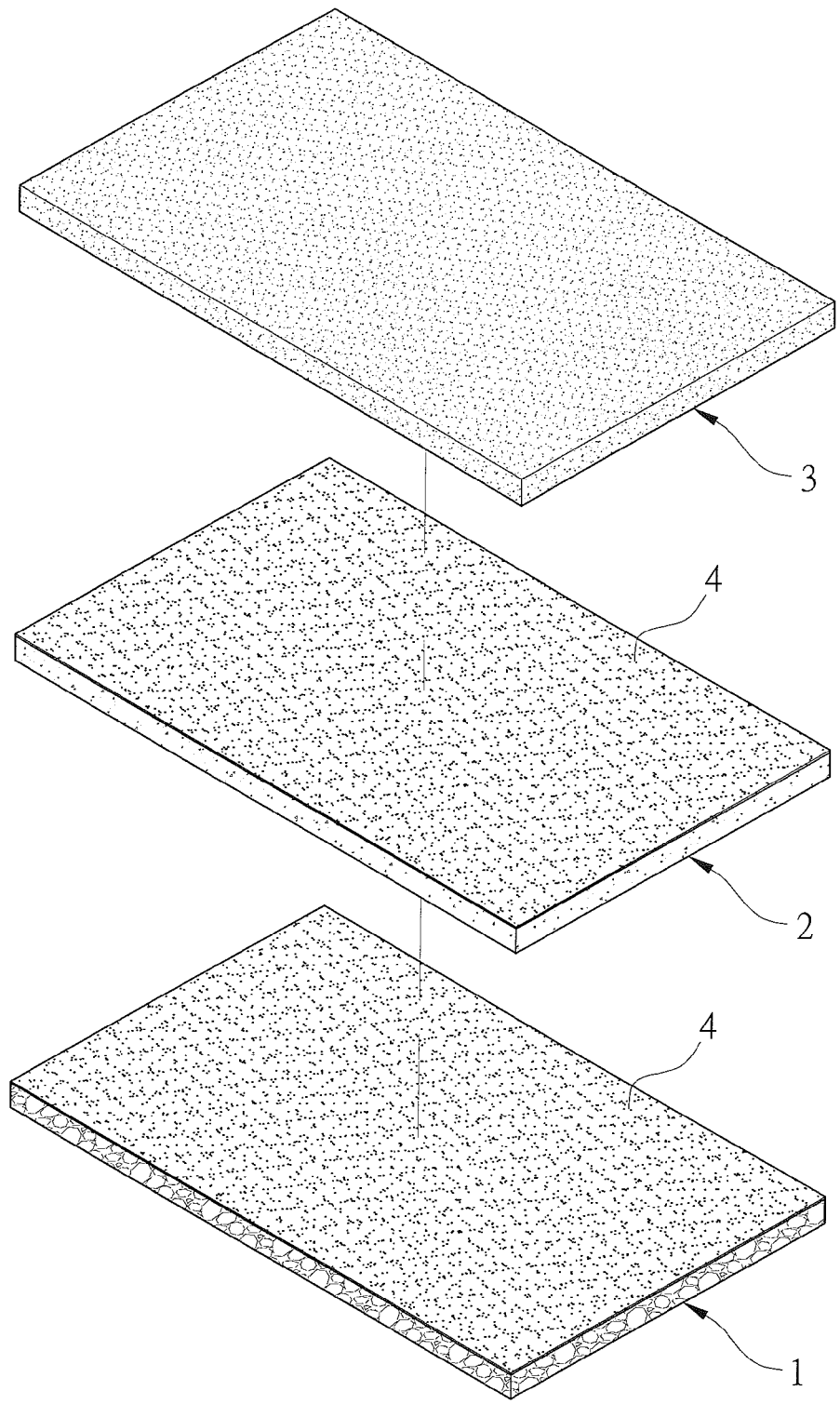
FIG. 1 is a schematic view showing a conventional method of adhering multiple polyurethane foam layers together.
Figure 2:
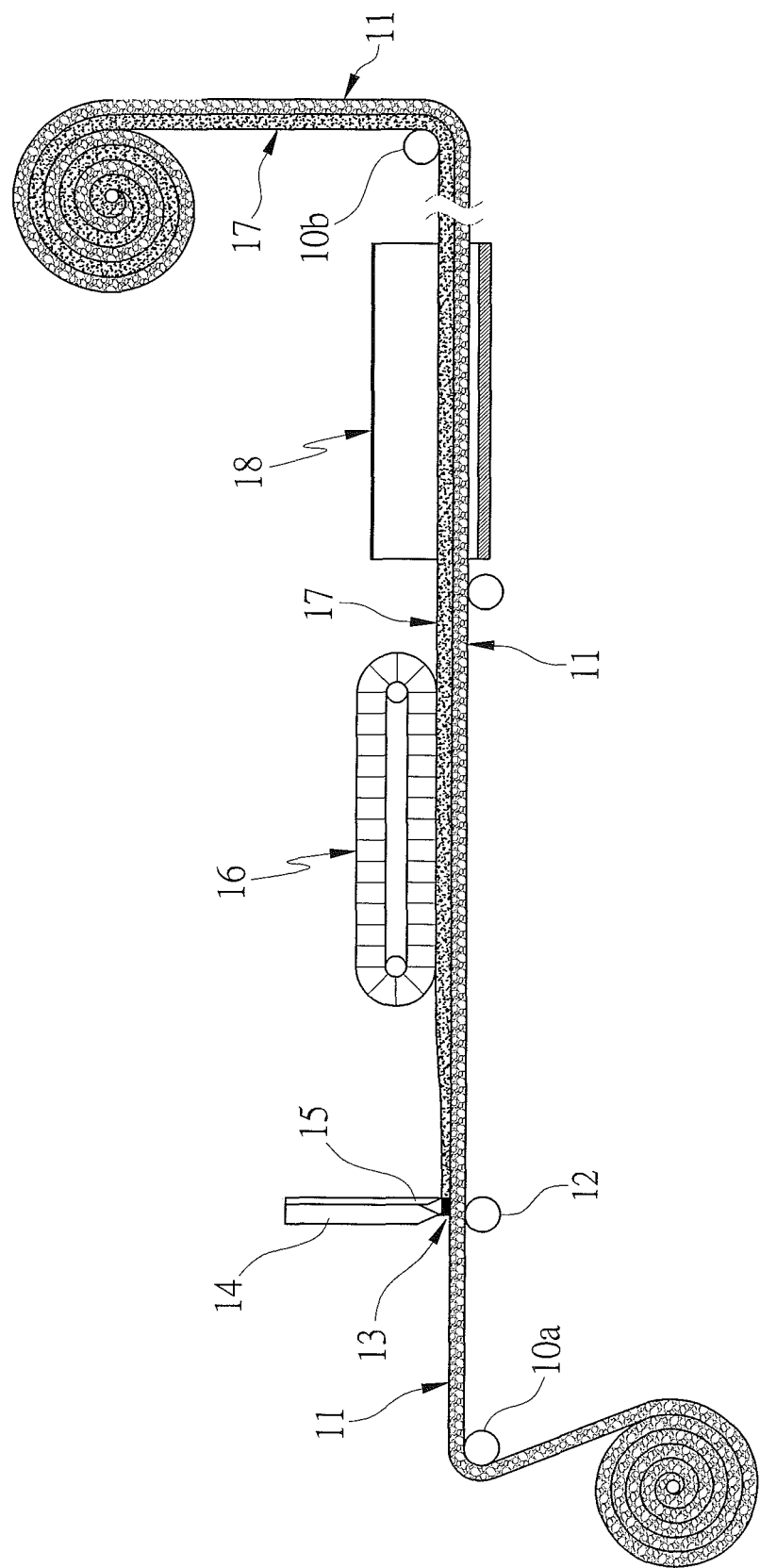
FIG. 2 is a schematic view of a method of adhering multiple polyurethane foam layers together according to a first embodiment of the present invention.

With reference to FIG. 2, a method of adhering multiple polyurethane foam layers together according to a first embodiment of the present invention is applied to stick a first polyurethane foam layer with a second polyurethane foam layer. A first rolling set 10a delivers the first polyurethane (PU) foam layer 11 toward a cladding position 12, and polyurethane system components 13 are clad or deposited on the first polyurethane foam layer 11 at the cladding position 12. The polyurethane system components 13 are comprised of an isocyanate component and a polyol component. Water and a catalyst are added into the polyurethane system components 13, so that the water and the isocyanate component are mixed to produce carbon dioxide by which the second polyurethane foam layer is foamed. The polyurethane system components 13 are identical to or different from the first polyurethane foam layer 11 according to using requirements. When the polyurethane system components 13 are evenly clad or deposited on the first polyurethane foam layer 11, they start foaming polymerization on the first polyurethane foam layer 11. In this embodiment, the polyurethane system components 13 are clad or deposited on the first polyurethane foam layer 11 at the cladding position 12 in a pouring manner or in a spraying manner. A scraper 15 is mounted behind and mates with a mixing nozzle 14 so that the polyurethane system components 13 are clad or deposited evenly. A cladding thickness of the polyurethane system components 13 is adjusted by changing a height position of the scrapper 15 and is determined based on a desired thickness of the second polyurethane foam layer. After starting the foaming polymerization on the first polyurethane foam layer 11, the polyurethane system components 13 enter into gaps of the first polyurethane foam layer 11 to adhere with the first polyurethane foam layer 11 securely. Thereafter, the polyurethane system components 13 and the first polyurethane foam layer 11 are conveyed to a press roller 16, so that the polyurethane system components 13 foam to produce the second polyurethane foam layer 17. Preferably, a height position of the press roller 16 is adjustable to control a foaming thickness of the polyurethane system components 13, and the foaming thickness of the polyurethane system components 13 is determined based on the desired thickness of the second polyurethane foam layer 17. To avoid the press roller 16 adhering with the polyurethane system components 13, Teflon is coated on the press roller 16 or the press roller 16 is made of a polyethylene (PE) material or a metal foil. Thereafter, the second polyurethane foam layer 17 and the first polyurethane foam layer 11 are delivered away from the press roller 16, thus foaming and adhering the second polyurethane foam layer 17 with the first polyurethane foam layer 11.

It is to be noted that the second polyurethane foam layer 17 does not polymerize completely after being delivered away from the press roller 16. For example, the second polyurethane foam layer 17 polymerizes at 80% and does not adhere with the press roller 16. To finish polymerization of the second polyurethane foam layer 17 quickly, a baking device 18 is arranged behind the press roller 16 to heat and dry the second polyurethane foam layer 17. Alternatively, a heating apparatus is fixed on the press roller 16 to heat and dry the second polyurethane foam layer 17. Thereafter, the first polyurethane foam layer 11 and the polyurethane foam layer 17 are adhered and are rolled together by using a second rolling set 10b.

Figure 3:
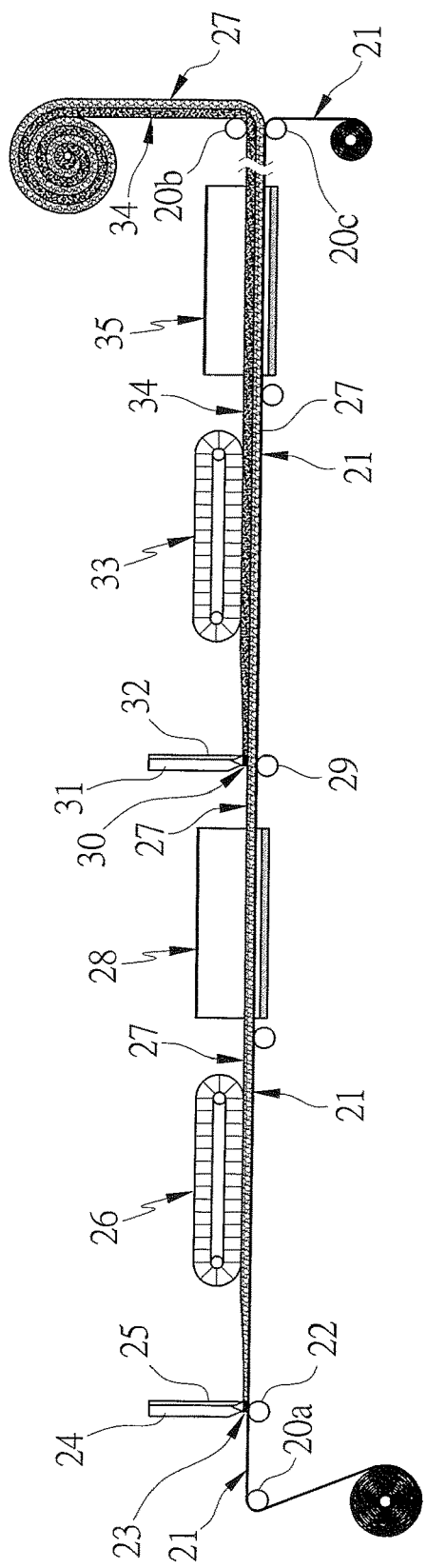
FIG. 3 is a schematic view of a method of adhering multiple polyurethane foam layers together according to a second embodiment of the present invention.

Referring to FIG. 3, a method of adhering multiple polyurethane foam layers together according to a second embodiment of the present invention is applied to produce a first polyurethane foam layer and to stick the first polyurethane foam layer and a second polyurethane foam layer together. A first rolling set 20a delivers a release layer 21 toward a first cladding position 22. In this embodiment, the release layer 21 is removed from the first polyurethane (PU) foam layer and the second polyurethane (PU) foam layer and is made of any one of a silicone coating material, a polyethylene (PE) material and a metal material, such as metal foil. Thereafter, the first polyurethane system components 23 are evenly clad or deposited on the release layer 21 at the first cladding position 22. When the first polyurethane system components 23 are evenly clad or deposited on the release layer 21, they start foaming polymerization. In this embodiment, the first polyurethane system components 23 are clad or deposited on the release layer 21 at the first cladding position 22 in a pouring manner or in a spraying manner. A first scraper 25 is mounted behind and mates with a first mixing nozzle 24 so that the first polyurethane system components 23 are clad or deposited evenly. A cladding thickness of the first polyurethane system components 23 is adjusted by changing a height position of the first scrapper 25 and is determined based on a desired thickness of the first polyurethane foam layer. After starting foaming polymerization on the release layer 21, the first polyurethane system components 23 are conveyed to a first press roller 26 so that the first polyurethane system components 23 foam to produce the first polyurethane foam layer 27. Preferably, a height position of the first press roller 26 is adjustable to control a foaming thickness of the first polyurethane system components 23, and the foaming thickness of the polyurethane system components 23 is determined based on the desired thickness of the first polyurethane foam layer 27. To avoid the first press roller 26 adhering with the first polyurethane system components 23, Teflon is coated on the first press roller 26 or the first press roller 26 is made of polyethylene (PE) material or a metal foil. Thereafter, the first polyurethane foam layer 27 is delivered away from the first press roller 26, thus foaming the first polyurethane foam layer 27.

It is to be noted that the first polyurethane foam layer 27 does not polymerize completely after being delivered away from the first press roller 26. For example, the first polyurethane foam layer 27 polymerizes at 80% and does not adhere with the first press roller 26. To finish polymerization of the first polyurethane foam layer 27 quickly, a first baking device 28 is arranged behind the first press roller 26 to heat and dry the first polyurethane foam layer 27. Alternatively, a heating apparatus is fixed on the first press roller 26 to heat and dry the first polyurethane foam layer 27. Thereafter, the first polyurethane foam layer 27 is conveyed to a second cladding position 29, and second polyurethane system components 30 are evenly clad or deposited on the first polyurethane foam 27 at the second cladding position 29. The second polyurethane system components 30 are identical to or different from the first polyurethane foam layer 23 according to using requirements. When the second polyurethane system components 30 are evenly clad or deposited on the first polyurethane foam layer 27, they start foaming polymerization on the first polyurethane foam layer 27. In this embodiment, the second polyurethane system components 30 are clad or deposited on the first polyurethane foam layer 27 at the second cladding position 29 in a pouring manner or in a spraying manner. A second scraper 32 is mounted behind and mates with a second mixing nozzle 31 so that the second polyurethane system components 30 are clad or deposited evenly. A cladding thickness of the second polyurethane system components 30 is adjusted by changing a height position of the second scrapper 32 and is determined based on a desired thickness of the second polyurethane foam layer. After starting foaming polymerization on the first polyurethane foam layer 27, the second polyurethane system components 30 enter into gaps of the first polyurethane foam layer 27 to adhere with the first polyurethane foam layer 27 securely. Thereafter, the second polyurethane system components 30 and the first polyurethane foam layer 27 are conveyed to a second press roller 33 so that the second polyurethane system components 30 foam to produce the second polyurethane foam layer 34. Preferably, a height position of the second press roller 33 is adjustable to control a foaming thickness of the second polyurethane system components 30, and the foaming thickness of the second polyurethane system components 30 is determined based on the desired thickness of the second polyurethane foam layer 34. To avoid the second press roller 33 adhering with the second polyurethane system components 30, Teflon is coated on the second press roller 33 or the second press roller 33 is made of polyethylene (PE) material or a metal foil. Thereafter, the second polyurethane foam layer 34 and the first polyurethane foam layer 27 are delivered away from the second press roller 33, thus foaming and adhering the second polyurethane foam layer 34 with the first polyurethane foam layer 27.

It is to be noted that the second polyurethane foam layer 34 does not polymerize completely after being delivered away from the second press roller 33. For example, the second polyurethane foam layer 34 polymerizes at 80% and does not adhere with the second press roller 33. To finish polymerization of the second polyurethane foam layer 34 quickly, a second baking device 35 is arranged behind the second press roller 33 to heat and dry the second polyurethane foam layer 34. Alternatively, a heating apparatus is fixed on the second press roller 33 to heat and dry the second polyurethane foam layer 34. Thereafter, the first polyurethane foam layer 27 and the second polyurethane foam layer 34 are rolled together by using a second rolling set 20b and are removed from the release later 21 by way of a third rolling set 20c.

Figure 4:
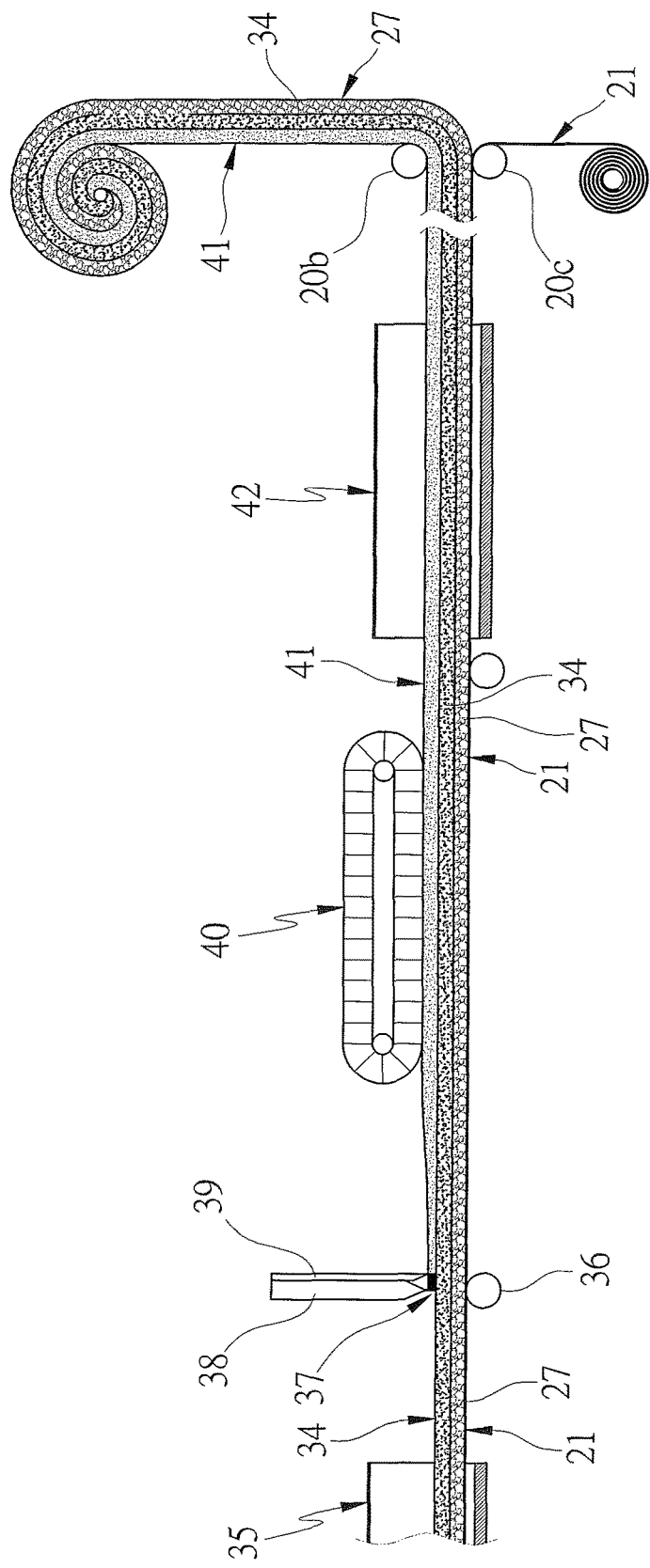
FIG. 4 is a schematic view of a method of adhering multiple polyurethane foam layers together according to a third embodiment of the present invention.

As shown in FIG. 4, a method of adhering multiple polyurethane foam layers together according to a third embodiment of the present invention is applied to stick a first polyurethane foam layer, a second polyurethane foam layer, and a third polyurethane foam layer together. A difference of the method of the third embodiment from that of the second embodiment comprises a step of delivering the first polyurethane foam layer 27 and the second polyurethane foam layer 34 toward a third cladding position 36 and a step of cladding third polyurethane system components 37 on the second polyurethane foam layer 34 at the third cladding position 36. The third polyurethane system components 37 are identical to or different from the first polyurethane system components and the second polyurethane system components according to using requirements. When the third polyurethane system components 37 are evenly clad or deposited on the second polyurethane foam layer 34, they start foaming polymerization on the second polyurethane foam layer 34. In this embodiment, the third polyurethane system components 37 are clad or deposited on the second polyurethane foam layer 34 at the third cladding position 36 in a pouring manner or in a spraying manner. A third scraper 39 is mounted behind and mates with a third mixing nozzle 38 so that the third polyurethane system components 37 are clad or deposited evenly. A cladding thickness of the third polyurethane system components 37 is adjusted by changing a height position of the third scrapper 39 and is determined based on a desired thickness of the third polyurethane foam layer. After starting foaming polymerization on the second polyurethane foam layer 34, the third polyurethane system components 37 enter into gaps of the second polyurethane foam layer 34 to adhere with the second polyurethane foam layer 34 securely. Thereafter, the third polyurethane system components 37, the second polyurethane foam layer 34, and the first polyurethane foam layer 27 are conveyed to a third press roller 40 so that the third polyurethane system components 37 foam to produce the third polyurethane foam layer 41. Preferably, a height position of the third press roller 40 is adjustable to control a foaming thickness of the third polyurethane system components 37, and the foaming thickness of the third polyurethane system components 37 is determined based on the desired thickness of the third polyurethane foam layer 41. To avoid the third press roller 40 adhering with the third polyurethane system components 37, Teflon is coated on the third press roller 40 or the third press roller 40 is made of a polyethylene (PE) material or a metal foil. Thereafter, the third polyurethane foam layer 41, the second polyurethane foam layer 34, and the first polyurethane foam layer 27 are delivered away from the third press roller 40, thus foaming and adhering the third polyurethane foam layer 41 with the second polyurethane foam layer 34 and the first polyurethane foam layer 27.

It is to be noted that the third polyurethane foam layer 41 does not polymerize completely after being delivered away from the third press roller 40. For example, the third polyurethane foam layer 41 polymerizes at 80% and does not adhere with the third press roller 40. To finish polymerization of the third polyurethane foam layer 41 quickly, a third baking device 42 is arranged behind the third press roller 40 to heat and dry the third polyurethane foam layer 41. Alternatively, a heating apparatus is fixed on the third press roller 40 to heat and dry the third polyurethane foam layer 41. Thereafter, the first polyurethane foam layer 27, the second polyurethane foam layer 34, and the third polyurethane foam layer 41 are adhered and are rolled together by using a second rolling set 20b and are removed from the release layer 21 by way of a third rolling set 20c.

Thereby, the multiple polyurethane foam layers are adhered successively by using polyurethane system components in polymerization foaming reaction to protect the environment and to enhance adhesion and production capacity. The multiple polyurethane foam layers are capable of being produced in a limited space. Preferably, the method of the present invention is capable of foaming and adhering one polyurethane foam layer with the other polyurethane foam layers to enhance production efficiency.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of adhering multiple polyurethane foam layers together to stick a first polyurethane foam layer with a second polyurethane foam layer by using second polyurethane system components of the second polyurethane foam layer in a polymerization foaming reaction, with the method comprising:

A. delivering the first polyurethane foam layer toward a second cladding position;

B. depositing the second polyurethane system components on the first polyurethane foam layer at the second cladding position so that the second polyurethane system components start foaming polymerization on and adhere with the first polyurethane foam layer;

C. delivering the second polyurethane system components and the first polyurethane foam layer to a press roller so that the second polyurethane system components foam to produce the second polyurethane foam layer, and the second polyurethane foam layer adheres with the first polyurethane foam layer;

D. conveying the second polyurethane foam layer and the first polyurethane foam layer away from the press roller; and after conveying, adhering a third polyurethane foam layer containing:

E. delivering the first polyurethane foam layer and the second polyurethane foam layer to a third cladding position;

F. depositing third polyurethane system components on the second polyurethane foam layer evenly at a third cladding position so that the third polyurethane system components start foaming polymerization on and adhere with the second polyurethane foam layer;

G. conveying the third polyurethane system components, the second polyurethane foam layer, and the first polyurethane foam layer to a further press roller so that the third polyurethane system components foam to produce the third polyurethane foam layer, and the third polyurethane foam layer adheres with the second polyurethane foam layer; and H. delivering the third polyurethane foam layer, the second polyurethane foam layer, and the first polyurethane foam layer away from the further press roller.

2. The method as claimed in claim 1, wherein depositing the second polyurethane system components comprises depositing the second polyurethane system components comprised of an isocyanate component and a polyol component, and adding water and a catalyst into the second polyurethane system components.

3. The method as claimed in claim 1, wherein depositing the second polyurethane system components comprises depositing the second polyurethane system components which are identical to or different from first polyurethane system components of the first polyurethane foam layer.

4. The method as claimed in claim 1, wherein depositing the second polyurethane system components comprises depositing the second polyurethane system components which are deposited on the first polyurethane foam layer in a pouring manner or in a spraying manner.

5. The method as claimed in claim 4, further comprising mounting a scraper behind a mixing nozzle so that the second polyurethane system components are deposited evenly on the first polyurethane foam layer in the pouring manner or in the spraying manner.

6. The method as claimed in claim 5, wherein a cladding thickness of the second polyurethane system components is adjusted by changing a height position of the scraper.

7. The method as claimed in claim 1, wherein delivering the second polyurethane system components includes adjusting a height position of the press roller to control a foaming thickness of the second polyurethane system components, with the foaming thickness of the second polyurethane system components determined based on a desired thickness of the second polyurethane foam layer.

8. The method as claimed in claim 1 further comprising a providing a baking device behind the press roller after conveying the first and second polyurethane foam layers.

9. The method as claimed in claim 1, wherein delivering the first polyurethane foam layer includes forming the first polyurethane foam layer containing:
 A1. delivering a release layer to a first cladding position by way of a rolling set;
 A2. depositing the first polyurethane system components on the release layer evenly at the first cladding position so that the first polyurethane system components start foaming polymerization on the release layer;
 A3. conveying the first polyurethane system components to an additional press roller so that the first polyurethane system components foam to produce the first polyurethane foam layer; and
 A4. delivering the first polyurethane foam layer away from the additional press roller.

* * * * *